Dec. 29, 1925.  1,567,679

J. W. RITTMAN ET AL

DRINK HEATER

Filed July 28, 1923

Inventors:
John W. Rittman
William Driver
John Rood

Patented Dec. 29, 1925.

1,567,679

UNITED STATES PATENT OFFICE.

JOHN WM. RITTMAN, JOHN ROOD, AND WILLIAM DRIVER, OF RACINE, WISCONSIN.

DRINK HEATER.

Application filed July 28, 1923. Serial No. 654,371. REISSUED

*To all whom it may concern:*

Be it known that we, JOHN W. RITTMAN, JOHN ROOD, and WILLIAM DRIVER, all citizens of the United States, and residents of Racine, in the county of Racine and State of Wisconsin, have invented certain new and useful Improvements in Drink Heaters; and we do hereby declare that the following is a full, clear, and exact description thereof.

This invention relates to drink heaters.

Heaters have heretofore been made for heating a single drink during the mixing operation, as for instance when it is mixed by motor driven beater or mixer. However, these heaters have heretofore been made integral with the beverage or mixing cup, and it has been difficult to avoid short circuits due to accumulation of moisture within the heater or its associated parts, and due to this an unsanitary condition frequently obtains, as it is not expedient to submerge the heater and thoroughly wash it.

This invention is designed to overcome the above noted defects, and objects of such invention are to provide a heater for the mixing cup usually employed in making individual drinks, which is detached and separate from the cup thus permitting the cup to be freely and thoroughly cleaned, which is adapted to cooperate with any number of cups, which is so designed that good thermal transmission takes place between the mixing cup and the heater, and which is so constructed that it releasably retains the cup so that it is not necessary to handle the hot cup in serving the drink.

An embodiment of the invention is shown in the accompanying drawings, in which:—

Figure 1:
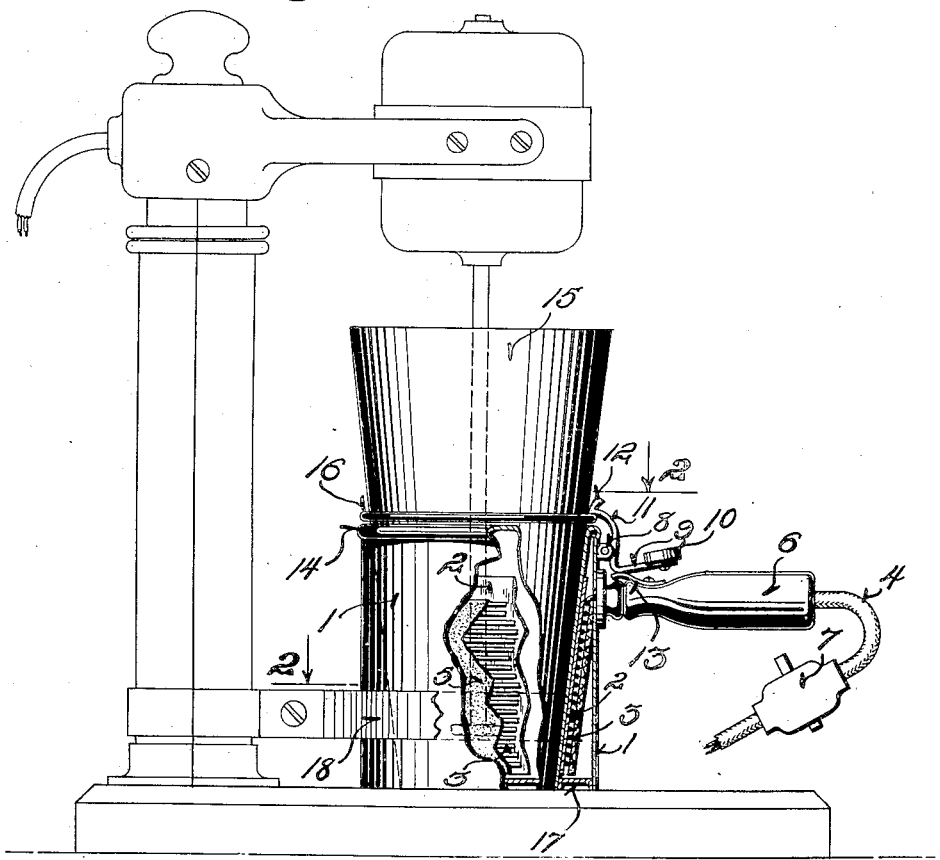
Figure 1 is a side elevation of the heater with the cup in position, parts being broken away for clearness, and showing the mixing beater in position.
Figure 2:
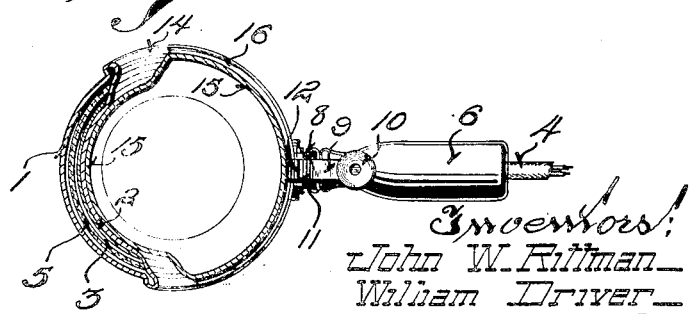
Figure 2 is a sectional view approximately on the line 2—2 of Figure 1.

The heater comprises a cylindrical member having an outer wall, 1, and a conical inner wall 2. Between these walls the heating element 3 is positioned and is connected to a suitable source of energy by means of the cable 4. A lining 5 having insulating properties may be positioned upon the outer side of the heater to prevent excessive radiation towards the outer side of the heater element and to concentrate the heat upon the inner wall 2. The heater is provided with a manipulating handle 6 through which the cable 4 is passed and, if desired, a switch 7 may be carried by the cable adjacent the handle. A small bell crank lever pivotally joined to lugs 8 is carried by the outer wall of the heater and has an outwardly projecting portion 9 provided with a thumb piece 10. It has an upwardly projecting curved portion 11 which is provided with a cam shaped latch end 12. A spring 13 urges the bell crank lever or latch in a counter clockwise direction.

The upper portion of the heater may be provided with an ornamental and reinforcing bead 14. The lower portion of the heater is closed by a removably positioned annularly flanged member 17 which has a drive fit between the inner and outer walls and seals the space within which the heater element 3 is located. This removable portion facilitates repair or replacement of the heating element and avoids the necessity of throwing away the entire heater when the heating element burns out.

This heater is designed to receive beverage cups or mixing cups 15. These cups are preferably of metal and are conical and accurately fit the conical inner wall 2 of the heater. They are provided with a bead 16 approximately centrally thereof over which the latch 12 catches.

In using the apparatus, a clean mixing cup 15 is inserted within the heater and the entire device is slipped into place between the usual grip arms 18 of the mixer. The current is turned on and the mixing is effected thus forming and heating the drink simultaneously. After the drink has been prepared, the cup and heater may be lifted as a unit by the handle 6 without necessitating the operator's handling the heating cup 15. The drink may be poured from the cup by tilting the heater and cup without danger of the cup falling from the heater. After the drink has been poured from the cup, obviously the cup may be readily detached from the heater by depressing the thumb piece 10 and a clean cup may be reinserted.

Although the heater has been described as cylindrical in general contour, it is to be understood that the term cylindrical is intended to cover strictly cylindrical shapes, oval shapes, conical shapes and other obvious variations of this order.

It will be seen, therefore, that a heater has been provided for heating drinks which may be easily kept in a clean condition, which is not subject to short circuits due to wetting from washing for instance, and which is instantly available for the reception of a clean mixing cup.

Although one form of the invention has been described in considerable detail, it is to be understood that the invention may be variously embodied and is, therefore, to be limited only as claimed.

We claim:

A drink heater comprising a body portion having an open end, said body portion having an inner wall for the reception of a cup and an outer wall, an electric heating element located between said walls, an outwardly projecting handle carried by said body portion, and a spring pressed bell crank shaped detent pivoted to said body portion and having one arm adapted to engage a cup and having a thumb piece positioned above the inner end of said handle.

In testimony that we claim the foregoing we have hereunto set our hands at Racine, in the county of Racine and State of Wisconsin.

JOHN ROOD.
JOHN WM. RITTMAN.
WILLIAM DRIVER.